(12) United States Patent
Lang

(10) Patent No.: US 8,979,619 B2
(45) Date of Patent: Mar. 17, 2015

(54) PACKAGING PLANT

(71) Applicant: Multivac Sepp Haggenmüller GmbH & Co. KG, Wolfertschwenden (DE)

(72) Inventor: Michael Lang, Buching (DE)

(73) Assignee: Multivac Sepp Haggenmueller GmbH & Co. KG, Wolfertschwenden (DE)

( * ) Notice: Subject to any disclaimer, the term of this patent is extended or adjusted under 35 U.S.C. 154(b) by 0 days.

(21) Appl. No.: 13/905,276

(22) Filed: May 30, 2013

(65) Prior Publication Data

US 2013/0324022 A1    Dec. 5, 2013

(30) Foreign Application Priority Data

May 31, 2012    (DE) .......................... 10 2012 010 845

(51) Int. Cl.
*A22C 11/00* (2006.01)
*B65G 47/51* (2006.01)

(52) U.S. Cl.
CPC .............. *A22C 11/00* (2013.01); *A22C 11/008* (2013.01); *B65G 47/5122* (2013.01)
USPC ......................................................... 452/32

(58) Field of Classification Search
USPC ........................ 452/30–32, 35–37, 46–48, 51; 198/461.1, 806, 807, 810.03, 810.04, 198/813, 825, 837, 842

See application file for complete search history.

(56) References Cited

U.S. PATENT DOCUMENTS

| | | | |
|---|---|---|---|
| 6,029,798 A * | 2/2000 | Miller | 198/810.01 |
| 6,216,848 B1 * | 4/2001 | Zens | 198/689.1 |
| 6,726,532 B2 * | 4/2004 | Lin et al. | 451/28 |
| 7,134,544 B1 * | 11/2006 | Kilper et al. | 198/813 |
| 7,383,944 B2 * | 6/2008 | Hall et al. | 198/860.3 |
| 8,220,614 B2 * | 7/2012 | Alexander et al. | 198/370.08 |
| 8,342,312 B2 * | 1/2013 | Alexander et al. | 198/370.08 |
| 8,550,236 B2 * | 10/2013 | Merten et al. | 198/810.04 |

FOREIGN PATENT DOCUMENTS

| | | |
|---|---|---|
| DE | 3711688 A1 | 10/1988 |
| DE | 4033475 A1 | 4/1992 |
| DE | 102010033526 A1 | 2/2012 |
| EP | 0253959 A2 | 1/1988 |

* cited by examiner

*Primary Examiner* — Richard Price, Jr.
(74) *Attorney, Agent, or Firm* — Husch Blackwell LLP

(57) ABSTRACT

The invention relates to a packaging plant for packing sausages or other objects, comprising a manufacturing device, a buffer device, a feeding device, an insertion device, and a packaging machine, the buffer device comprising a length-variable transport section, and a method for operating a packaging plant according to the invention.

11 Claims, 2 Drawing Sheets

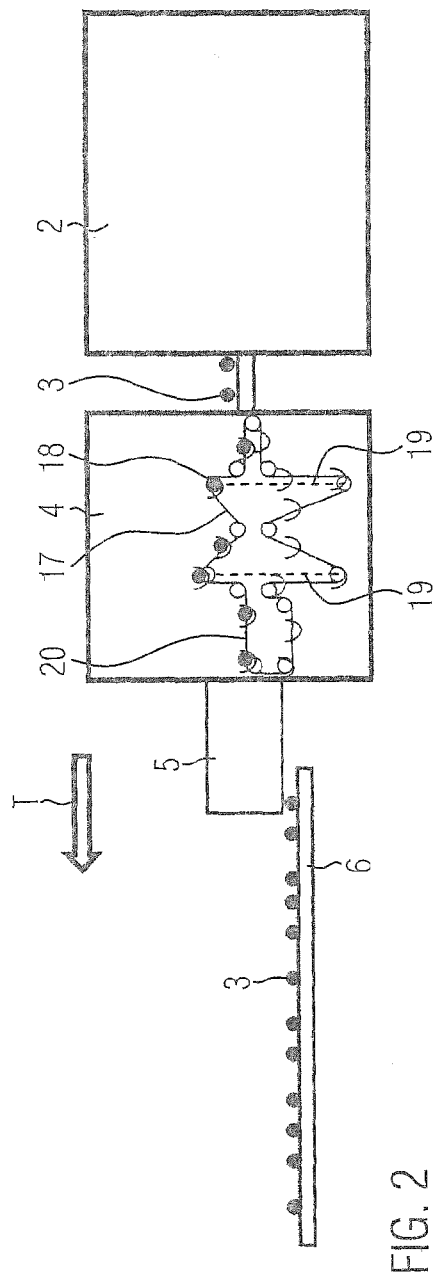
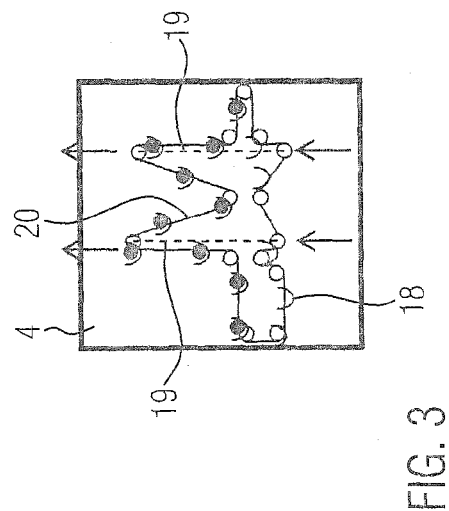
FIG. 2
FIG. 3

PACKAGING PLANT

CROSS-REFERENCE TO RELATED APPLICATIONS

This Application claims priority to German Application Number 102012010845.1 filed May 31, 2012, to Michael Lang entitled "Packaging Plant," currently pending, the entire disclosure of which is incorporated herein by reference.

FIELD OF THE INVENTION

The invention relates to a packaging plant for packing sausages and to a method for operating a packaging plant.

BACKGROUND OF THE INVENTION

Packaging plants for sausages where the sausages, after having been treated in an oven, are placed into a basin with water are well known from practice. This water basin functions as buffer or intermediate reservoir from which the sausages are withdrawn and fed to a packaging machine in the further proceeding. Another well-known variant is a vibrating tub onto which the sausages coming from the oven are placed and transported to the zone from where they are withdrawn for further processing by means of a vibrating device. In this case, the sausages must be wetted directly when they come from the oven so that they can be transported on the vibrating tub by means of vibration. This moisture is basically undesirable for bacterial reasons, and sometimes an additional drying device for the sausages before packaging is required. These two variants of intermediate reservoirs require a lot of space, and a controlled transport and discharge of the sausages according to the first-in first-out principle is not ensured.

SUMMARY OF THE INVENTION

It is the object of the present invention to provide a packaging plant for sausages which does not involve the above-mentioned drawbacks.

The inventive packaging plant for packing sausages or other oblong food comprises a manufacturing device, a buffer device, a feeding device, an insertion device and a packaging machine, the buffer device comprising a transport section that can be varied in its length. By the possibility of a length-variable transport section, the buffer device can have a small and fixed space requirement between the manufacturing device and the feeding device.

The manufacturing device which transfers the sausages to the buffer device may be an oven.

The feeding device can have two tracks, the two tracks preferably being located on either side of and along the packaging machine for inserting the sausages into a multi-track packaging machine from two sides with insertion devices and produce a high packaging performance.

Between the buffer device and the feeding device, a sorting device for distributing the sausages onto two tracks of the feeding device may be provided. This permits to feed the sausages to the packaging machine from two sides and to singularize or space the sausages with respect to each other.

In one embodiment, a single-lining device is provided downstream of the packaging machine in the direction of transport to be able to individually supply the packages in which one or several sausages are packed to further working stations, such as a labeling machine, a checkweigher and/or a metal detector. These are preferably provided downstream of the packaging machine in the direction of transport.

The buffer device may comprise a transport system and several adjustable pairs of rollers, where the transport section for transporting the sausages can be elongated by an upward movement of the pairs of deflection rollers and shortened by a downward movement. This change of the transport system permits to change the length of the transport section without changing the space requirement or the position of the transfer between the manufacturing device and the feeding device or the sorting device. The requirement with respect to the floor space to be provided is minimal.

The insertion device can comprise two or three pickers per track of the feeding device. This permits to insert sausages into a three- or four-track packaging machine with simultaneously a maximum performance of the packaging machine.

In one embodiment, at least one first conveying belt and one second conveying belt are provided for each track of the feeding device, the second conveying belt which is arranged in the region of the last disposed picker in the direction of transport being movable at a lower speed than the first conveying belt. As for the respective last picker in the direction of transport, only a small number of sausages to be inserted is present, but the last picker should take care that the still empty gaps in the packages are filled with sausages, it may be advantageous for the second conveying belt to run more slowly and on the one hand reduce the distance between the individual sausages and on the other hand give the picker the required time so as to grip and insert all sausages, if possible.

The pickers may have a gripper for picking up at least two, preferably three, sausages to increase the efficiency or the performance, respectively, mainly compared to grippers that can only pick up one sausage.

An inventive method for operating an inventive packaging plant is characterized in that the buffer device elongates the transport section as soon as the sausages can no longer be passed on from the buffer device.

The transport section can be shortened again as soon as, after a buffering period, the sausages can be passed on again from the buffer device.

The transport system at the end of the buffer device is preferably stopped while the transport section is being elongated, and at least one pair of rollers is lifted. Thus, no more sausages are transferred to the feeding device or the sorting device, while simultaneously sausages can still be picked up from the continuously running manufacturing device on the transport system of the buffer device.

At the transport system of the buffer device, receptacles of a long length can be provided for receiving several sausages and lie one against the other in a row along the orientation of the receptacles. Here, no wetting installations are required as the row of sausages at the end of the buffer device can be handed over from the receptacles to the feeding device or the sorting device without having to slide within the receptacles. It is conceivable for the receptacles to empty the sausages downwards from the receptacle by tilting them, or for the receptacles themselves to have a folding bottom through which the sausages can fall out. Here, it is not necessary for the receptacles to only pass on the sausages at one single position; it is also conceivable to provide two different discharge positions to distribute the sausages onto two feeding devices which transport the sausages to the packaging machine.

Other and further objects of the invention, together with the features of novelty appurtenant thereto, will appear in the course of the following description.

DESCRIPTION OF THE SEVERAL VIEWS OF THE DRAWING

In the accompanying drawing, which forms a part of the specification and is to be read in conjunction therewith in which like reference numerals are used to indicate like or similar parts in the various views:

FIG. 2 is a schematic side view illustrating the buffer device of a packaging plant according to one embodiment of the present invention; and FIG. 3 is a schematic side view illustrating a buffer device having an elongated transport section according to one embodiment of the present invention.

Equal components are always provided with the same reference numerals in the figures.

DETAILED DESCRIPTION OF THE INVENTION

Figure 1:
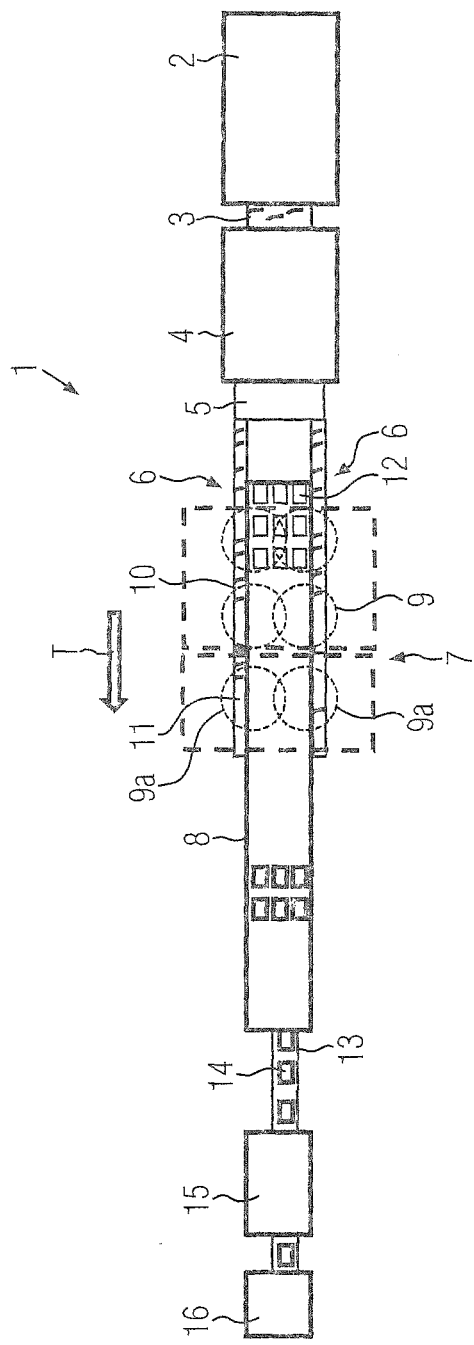
FIG. 1 is a schematic view illustrating a packaging plant according to one embodiment of the present invention.

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

The following detailed description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and the description is, therefore, not to be taken in a limiting sense and shall not limit the scope of equivalents to which such claims are entitled.

FIG. 1 shows an inventive packaging plant 1 with a direction of transport T. The packaging plant 1 starts with an oven 2 for treating sausages 3 from the right in the direction of transport T. The oven can be followed by a buffer device 4 and a sorting device 5 which distributes the sausages 3 onto two feeding devices 6. The feeding devices 6 are arranged in the region of the insertion device 7 on either side along the packaging machine 8 in the form of a deep-drawing packaging machine. The insertion device 7 may comprise altogether six pickers 9, three pickers 9 being provided for one feeding device 6 each. One feeding device 6 each comprises at least one first conveying belt 10 extending in the direction of transport T to a point ahead of a last picker 9a, and one second conveying belt 11 which is disposed at least below the last picker 9a. The last picker 9a is provided for inserting the missing sausages 3 into the not yet filled package troughs 12 and to this end grips the sausages 3 from the second conveying belt 11 which have not been inserted by the pickers 9 disposed upstream.

A single-lining device 13 may be provided following the packaging machine 8, or the single-lining device 13 can be part of the packaging machine 8 to feed the packages 14 to a checkweigher 15 individually or in line at a distance necessary for weighing. Then, a labeling machine 16, for example a price labeling machine, can furthermore provided.

FIG. 2 shows a side view of the buffer device 4 comprising a circulating transport system 17 to which receptacles 18 for receiving several sausages 3 are attached at regular intervals. The oven 2 transfers a predetermined number of sausages 3 into the receptacle 18 of the buffer device 4. By means of the transport system 17, the receptacles 18 can be transported together with the sausages 3 in the direction of transport T to the sorting device 5 where the sausages 3 are singularized and transferred to a feeding device 6 in a row. On this conveyor section, the receptacles 18 are aligned such that their openings always face upwards so that they do not lose the received sausages 3.

It might occur that a film must be changed on the packaging machine 8 and the packaging machine 8 is stopped for this. Then, the pickers 9, 9a, the conveying belts 10, 11, the feeding device 6, and the sorting device 5 are also stopped. Since the oven 2 cannot be stopped as long as sausages 3 are located inside it, the buffer device 4 continues receiving sausages 3 from the oven 2 without discharging sausages 3 to the sorting device 5.

The shown buffer device 4 has two vertically adjustable pairs of rollers 19. Since the transport system 17 is stopped at the end of the buffer device 4 but continues running at the start for receiving the sausages 3, by a vertical upward adjustment of the pairs of rollers 19, the transport section 20 of the transport system 17 with the filled receptacles 18 is enlarged, and the length of the transport system 17 with the emptied receptacles 18 (i. e. the return section) is shortened to the same degree. In the process, further sausages 3 can be received from the continuously running oven 2 without discharging sausages 3 to the following units. As soon as the sausages 3 can be discharged again to the sorting device 5, the transport system 17 also continues running again at the rear end, preferably at a somewhat higher speed, to adjust the pairs of rollers 19 downwards again with the same capacity, so that the transport section 20 of the conveyor system 17 with the filled receptacles 18 is shortened and the length of the transport system 17 with the emptied receptacles 18 is enlarged to the same degree to be able to provide again, at a later point in time of processing, a buffer capacity by elongating the transport section 20 of the transport system 17 for filled receptacles 18.

An advantageous, not represented variant of the buffer device 4 provides that at the end of the buffer device 4, the receptacles 18 transfer the sausages 3 to at least two feeding devices 6 at least two different positions. In this case, a sorting device 5 can be omitted.

In FIGS. 2 and 3, only two adjustable pairs of rollers 19 are represented only for a better overview. The buffer device 4 can have a more effective buffering capacity the more pairs of rollers 19 are provided and the longer the path is by which the pairs of rollers 19 can be adjusted vertically.

From the foregoing, it will be seen that this invention is one well adapted to attain all the ends and objects hereinabove set forth together with other advantages which are obvious and which are inherent to the structure. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions and methods described above and illustrated in the drawings are presented by way of example only and are not intended to limit the concepts and principles of the present invention. Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. Packaging plant for packing sausages or other objects, said packaging plant comprising:
    a manufacturing device;
    a buffer device having a length-variable transport section;
    a feeding device;
    an insertion device; and
    a packaging machine.

2. Packaging plant according to claim 1, wherein the manufacturing device is an oven.

3. Packaging plant according claim 1, wherein the feeding device has two tracks, wherein one track is located on either side along the packaging machine.

4. Packaging plant according to claim 3, wherein a sorting device for distributing the sausages onto the two tracks of the feeding device is provided between the buffer device and the feeding device.

5. Packaging plant according to claim 1, wherein in a direction of transport behind the packaging machine, a single-lining device is provided.

6. Packaging plant according to claim 1, wherein in a direction of transport behind the packaging machine, a labeling device and/or a weighing device is provided.

7. Packaging plant according to claim 1, wherein the buffer device comprises a transport system and several adjustable pairs of rollers, wherein the transport section can be elongated by an upward movement of the pairs of rollers and shortened by a downward movement of the pairs of rollers.

8. Packaging plant according to claim 7, wherein the transport system comprises a plurality of receptacles.

9. Packaging plant according to claim 1, wherein the insertion device comprises at least two pickers per track of the feeding device.

10. Packaging plant according to claim 9, wherein the feeding device has two tracks, each track having at least one first conveying belt and one second conveying belt, the second conveying belt which is arranged in the region of the last picker disposed in the direction of transport being movable at a lower speed than the first conveying belt.

11. Packaging plant according to claim 9, wherein each picker comprises a gripper for receiving at least two, preferably three sausages.

* * * * *